United States Patent [19]

Kirk et al.

[11] Patent Number: 4,884,086

[45] Date of Patent: Nov. 28, 1989

[54] METHOD OF ALIGNMENT OF LED CHIPS

[75] Inventors: Richard A. Kirk; Peter R. Lee; Peter B. Hart, all of Northampton; George A. A. Chilton, Buckinghamshire; Alan J. Cobb, Northampton, all of England

[73] Assignee: Plessey Overseas Limited, Ilford, England

[21] Appl. No.: 251,498

[22] Filed: Sep. 30, 1988

[30] Foreign Application Priority Data

Sep. 30, 1987 [GB] United Kingdom ................. 8722945

[51] Int. Cl.[4] ............................................ G01D 15/00

[52] U.S. Cl. .................................... 346/155; 346/160

[58] Field of Search ................... 346/154, 160, 107 R, 346/108; 356/401; 357/17, 19; 250/552, 553, 548, 557; 355/8; 400/119; 358/300, 302

[56] References Cited

U.S. PATENT DOCUMENTS

| | | | |
|---|---|---|---|
| 4,596,995 | 6/1986 | Yamakawa et al. | 346/160 |
| 4,703,334 | 10/1987 | Mochimara et al. | 346/155 |
| 4,724,490 | 2/1988 | Tanioka | 346/160 |

*Primary Examiner*—Arthur G. Evans

*Attorney, Agent, or Firm*—Fleit, Jacobson, Cohn, Price, Holman & Stern

[57] ABSTRACT

A method of alignment of monolithic chips of arrays of light emitting diodes to form part of a print head, the method comprising placing microscopically visible alignment marks on each chip in predetermined positions relative to the diode array carried on the chip, positioning two chips adjacent to one another in desired relative positions, and viewing the two chips through a microscope having a graticule, whereby the alignment marks of the two chips are positioned on the cross wires of the graticule whereby the chips are aligned with their respective diode arrays in a correct spacing and orientation relative to one another.

7 Claims, 2 Drawing Sheets

METHOD OF ALIGNMENT OF LED CHIPS

Figure 1:
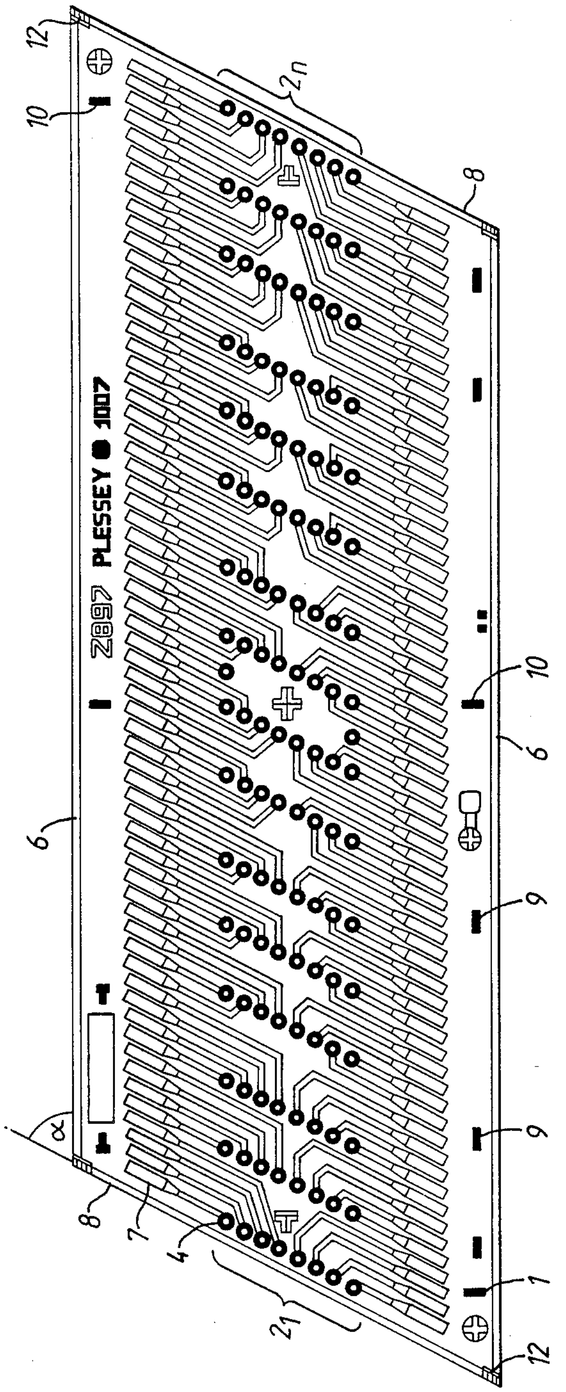

This invention relates to a method of alignment of monolithic chips of light emitting diodes (LED) arrays for use in line printers.

Current printing applications require high resolution and consequent high pixel density monolithic LED arrays and close tolerance electro-optical performance. For arrays requiring 400, 600 or more pixel elements per inch the linear pitch between elements (and thus the pitch between diodes of a print array) needs to be controlled to within tolerances of a few microns (<10). Within any given LED array chip this requirement is controlled by the accuracy of the photomask used in the photolithographic process employed during manufacture (usually sub-micron). Significant alignment problems can occur, however, between diode arrays of separate chips when substantial lengths of linear array are required to be composed from a row of chips for full width line printing on standard paper sizes, A1,2,3,4 etc. or even as long as one meter.

For the building up of linear LED arrays consisting of more than one chip into complete arrays of required length, careful consideration has to be paid to the maintenance of the above mentioned pixel pitch tolerance.

The present invention provides a method of alignment of monolithic chips of light emitting diodes to form part of a print head, the method comprising placing microscopically visible alignment marks on each chip in predetermined positions relative to the diode array carried on the chip, positioning two chips adjacent to one another in desired relative positions, and viewing the two chips through a microscope having a graticule, whereby the alignment marks of the two chips are positioned on the cross wires of the graticules whereby the chips are aligned with their respective diode arrays in a correct spacing and orientation relative to one another.

The present invention also extends to a chip carrying an array of light emitting diodes for use in the aforesaid method, the chip having microscopically visible alignment marks on its surface in predetermined positions relative to the array of light emitting diodes whereby to permit the alignment of the diode array with respect to the diode array of a similar chip by aligning the alignment marks with the cross wires of the graticule of a microscope when the two chips are placed in the field of view of the microscope.

In our co-pending British patent application 8722946 (our ref: F 20425), there is disclosed a light emitting diode array for a line printer head disposed on a single chip and comprising at least two parallel rows of diodes, each row comprising a plurality of diodes, wherein the rows are disposed at an angle to the intended direction of scanning movement during a print operation, means for supplying electric current pulses to the diodes, and means for delaying application of the current pulses such that during a print operation the diodes are powered by current pulses at instants when the diodes occupy the same position in the direction of scanning movement, thereby to produce a print line perpendicular to the direction of scanning movement.

The present invention is particularly applicable to chips having such diode arrays, since it is convenient to form the chips in a rhomboidal shape with the sides of the chip being angled so as to be parallel to the rows of diodes; this is desirable since any other cut of chip side would result in unnecessary chip surface wastage and would result in the chips not being able to be placed sufficiently close together to be aligned properly in a print head.

With such rhomboid-shaped chips, it is merely necessary to place alignment marks along one chip side for alignment in one direction and thus to place an alignment mark in the corner of the rhomboid shape subtending an acute angle. The alignment process can then be carried out by aligning the alignment marks in the respective corners of two chips on a single wire of a microscope graticule, the other said marks being aligned on the wire of the graticule extending in the opposite direction.

Figure 2:
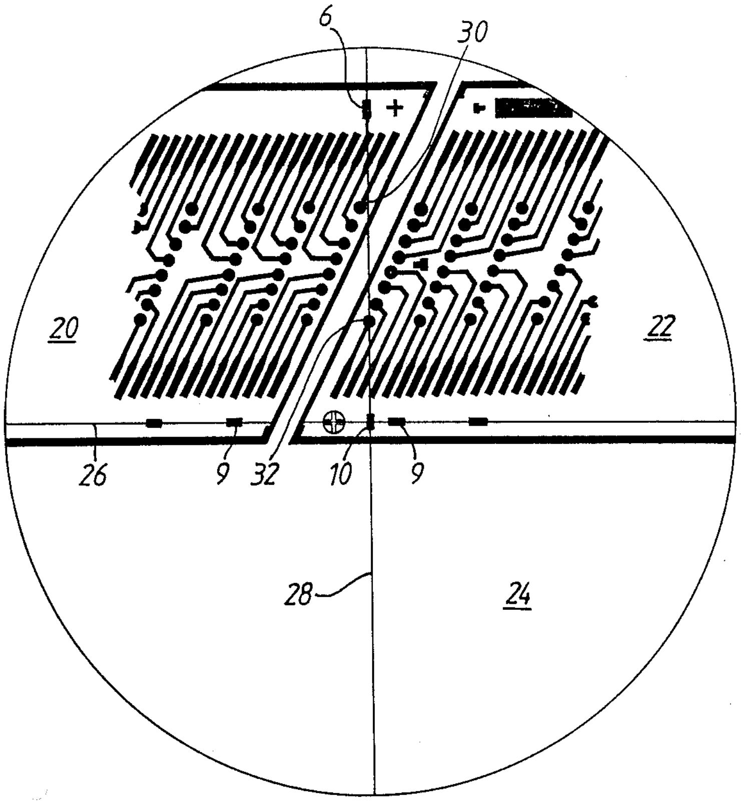

A preferred embodiment of the invention will now be described with reference to the accompanying drawings, wherein:

FIG. 1 is a plan view of a chip bearing a light emitting diode array and alignment marks in accordance with the invention, and FIG. 2 is a microscope field of view during the alignment of two chips as shown in FIG. 1, in accordance with the invention.

Referring now to FIG. 1, there is shown an an LED array chip comprising parallel rows of diodes $2_1, 2_2 \ldots 2_n$, each comprising eight diodes 4, 42 $\mu$m in diameter spaced from one another by a distance of 94 $\mu$m (centre to centre) and subtending an angle $\alpha = \tan - 12$ with the longitudinal sides of the chip 6. Conductive paths 7 are provided to diodes 4. The other sides 8 of the chip are machined to make an angle $\alpha$ $\tan - 12$ with longitudinal sides 6. It will be appreciated that rows 2 are disposed at an angle to the scanning direction during a printing operation for reduction in thermal coupling, as is fully described in our pending British patent application 8722946 (our ref: F20425).

Alignment marks 9 are provided extending parallel to one longitudinal edge of the chip and further alignment marks 10 are provided extending in a perpendicular direction at the centre of the chip and at each apex 12 subtending an acute angle $\alpha$.

Thus in order to align two chips 20, 22 for use in a print head of a line printer, it is necessary to place the two chips end to end in the field of view 24 of a microscope (FIG. 2). The chips are then aligned with edge alignment marks 9 disposed along one cross wire 26 of the microscope graticule and the corner alignment marks 10 aligned with the perpendicular cross wire 28 of the graticule. It will be observed that this automatically aligns the uppermost diode 30 in the end row of chip 20, one pitch along from diode 32 in the end row of chip 20, thus preserving the desired spacing and alignment between the rows of the LED arrays in order to achieve the desired quality of print.

We claim:

1. A method of alignment of monolithic chips of light emitting diodes to form part of a print head, the method comprising placing microscopically visible alignment marks on each chip in predetermined positions relative to the diode array carried on the chip, positioning two chips adjacent to one another in desired relative positions, and viewing the two chips through a microscope having a graticule, whereby the alignment marks of the two chips are positioned on the cross wires of the graticule whereby the chips are aligned with their respective diode arrays in a correct spacing and orientation relative to one another.

2. A monolithic LED chip for use in the method of claim 1, the chip carrying an array of light emitting diodes and microscopically visible alignment marks on its surface in predetermined positions relative to the array of light emitting diodes whereby to permit the alignment of the diode array with respect to the diode array of a similar chip by aligning the alignment marks with the cross wires of the graticule of a microscope when the two chips are placed in the field of view of the microscope.

3. A method as claimed in claim 1 wherein at least one of the chips has an array LED comprising a plurality of parallel rows of LED with each row comprising a plurality of LED, the parallel rows being disposed parallel to one pair of side edges of the chip, and with alignment marks being disposed in a line parallel to the intended direction of line printing.

4. A method as claimed in claim 3, wherein the chip is of rhomboid form with two longitudinal side edges and said one pair of side edges being disposed at an angle to the longitudinal side edges, with first alignment marks being disposed parallel to the longitudinal edges, and with second alignment marks being disposed adjacent an apex of the rhomboid shape subtending said angle and extending in a direction perpendicular to said longitudinal edges.

5. A method as claimed in claim 4 comprising aligning the first alignment marks on one cross wire of the graticule of the microscope, and aligning the second alignment marks on a perpendicular cross wire of the graticule.

6. A chip as claimed in claim 2, wherein the chip has an array of LED comprising a plurality of parallel rows of LED with each row comprising a plurality of LED, the parallel rows being disposed parallel to one pair of side edges of the chip, and with alignment marks being disposed in a line parallel to the intended direction of line printing.

7. A chip as claimed in claim 6, wherein the chip is of rhomboid form with two longitudinal side edges and said one pair of side edges being disposed at an angle to the longitudinal side edges, with first alignment marks being disposed parallel to the longitudinal edges, and with second alignment marks being disposed adjacent an apex of the rhomboid shape subtending said angle and extending in a direction perpendicular to said longitudinal edges.

* * * * *